(12) United States Patent
Kuniyasu et al.

(10) Patent No.: US 10,466,417 B2
(45) Date of Patent: Nov. 5, 2019

(54) OPTICAL FIBER FUSION SPLICE STRUCTURE AND METHOD OF MANUFACTURING LASER APPARATUS

(71) Applicant: FUJIKURA LTD., Tokyo (JP)

(72) Inventors: Kenji Kuniyasu, Sakura (JP); Ryokichi Matsumoto, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 16/082,661

(22) PCT Filed: Mar. 1, 2017

(86) PCT No.: PCT/JP2017/008084
§ 371 (c)(1),
(2) Date: Sep. 6, 2018

(87) PCT Pub. No.: WO2017/183321
PCT Pub. Date: Oct. 26, 2017

(65) Prior Publication Data
US 2019/0086612 A1   Mar. 21, 2019

(30) Foreign Application Priority Data

Apr. 18, 2016 (JP) .................................. 2016-082759

(51) Int. Cl.
| | |
|---|---|
| *G02B 6/255* | (2006.01) |
| *H01S 3/00* | (2006.01) |
| *G02B 6/36* | (2006.01) |

(52) U.S. Cl.
CPC ........... *G02B 6/2551* (2013.01); *G02B 6/255* (2013.01); *G02B 6/2558* (2013.01); *G02B 6/3636* (2013.01); *H01S 3/00* (2013.01)

(58) Field of Classification Search
None
See application file for complete search history.

(56) References Cited

U.S. PATENT DOCUMENTS 4,664,732 A * 5/1987 Campbell .............. G01M 11/35
  156/158
4,778,242 A * 10/1988 Ota ...................... G02B 6/2558
  385/141

(Continued)

FOREIGN PATENT DOCUMENTS

| JP | 10-180874 A | 7/1998 |
| JP | 2007-271786 A | 10/2007 |

(Continued)

OTHER PUBLICATIONS

International Search Report dated May 23, 2017, issued in counterpart International Application No. PCT/JP2017/008084 (2 pages).

(Continued)

*Primary Examiner* — Chad H Smith
(74) *Attorney, Agent, or Firm* — Westerman, Hattori, Daniels & Adrian, LLP (57) ABSTRACT

The optical fiber fusion splice structure has a fusion splice portion at which the bare fibers exposed from the coverings are connected to each other by fusion splicing, a fiber accommodation portion having a fiber accommodation groove formed along an axis of the optical fibers, and fixation resins for fixing a portion of the coverings on both sides of the fusion splice portion within the fiber accommodation groove. The fiber accommodation groove receives a portion of the optical fibers including the fusion splice portion. The fixation resins are formed so as to fill the fiber accommodation groove in a depth direction. A pipe member that allows an infrared ray to pass therethrough is attached around the fiber accommodation portion so as to surround a space between the fixation resins on both sides of the fusion splice portion within the fiber accommodation groove.

14 Claims, 11 Drawing Sheets

(56) References Cited

U.S. PATENT DOCUMENTS

| | | | |
|---|---|---|---|
| 6,117,257 A | 9/2000 | Takahashi et al. | |
| 7,494,289 B1 | 2/2009 | Chen | |
| 2003/0012238 A1 | 1/2003 | Wu | |
| 2003/0091293 A1* | 5/2003 | Murata | G02B 6/2558 |
| | | | 385/70 |
| 2009/0052846 A1 | 2/2009 | Miyamori et al. | |
| 2010/0188735 A1 | 7/2010 | Tamaoki | |
| 2011/0221081 A1* | 9/2011 | Wang | G02B 6/2558 |
| | | | 264/1.25 |

FOREIGN PATENT DOCUMENTS

| | | |
|---|---|---|
| JP | 2007-310080 A | 11/2007 |
| JP | 2008-187100 A | 8/2008 |
| JP | 2009-115918 A | 5/2009 |
| JP | 2010-171322 A | 8/2010 |
| JP | 2013-174583 A | 9/2013 |
| JP | 2015-182793 A | 10/2015 |

OTHER PUBLICATIONS

European Search Report dated Sep. 16, 2019, issued in counterpart European Application No. 17785665.5.

* cited by examiner

Fig. 1

SECTION A-A

Fig. 2

SECTION B-B

Fig. 3

SECTION C-C

OPTICAL FIBER FUSION SPLICE STRUCTURE AND METHOD OF MANUFACTURING LASER APPARATUS

TECHNICAL FIELD

The present invention relates to an optical fiber fusion splice structure, and more particularly to an optical fiber fusion splice structure in which optical fibers are connected to each other by fusion splicing and a method of manufacturing a laser apparatus including such an optical fiber fusion splice structure.

BACKGROUND ART

For example, in many cases, optical fibers are connected to each other by removing coverings of the optical fibers and fusion-splicing bare fibers of the optical fibers to each other. Such portions of the optical fibers where the coverings have been removed are vulnerable to external forces and may be broken when any impact or vibration is exerted to the optical fibers. In order to protect a fusion splice portion from external forces, therefore, the fusion splice portion of the optical fibers needs to be reinforced. Meanwhile, with regard to an optical fiber for transmitting pump light that is used in a fiber laser or the like, the pump light is likely to leak from a fusion splice portion. Thus, it is necessary to prevent pump light from leaking from such a fusion splice portion.

Accordingly, there has been proposed a structure that holds a fusion splice portion within a metal housing in a state in which the fusion splice portion is recoated with a resin having a refractive index equal to or lower than a refractive index of a cladding or a covering of an optical fiber while the resin is covered with a reinforcing sleeve (see, e.g., Patent Literature 1). With such a structure, the recoated resin can prevent pump light from leaking out of the fusion splice portion, and the reinforcing sleeve and the metal housing can protect the fusion splice portion from external forces.

Meanwhile, when a laser apparatus including such a fusion splice portion is to be manufactured, it is necessary to ascertain whether no defects are found at a fusion splice portion of optical fibers. Such defects of optical fibers at a fusion splice portion are found by operating a laser apparatus under the same conditions as those in a normal operation or under different conditions than those in a normal operation and measuring the temperature of the fusion splice portion to determine whether unusual heat generation is caused to the fusion splice portion. Such temperature measurement is often performed by detecting an infrared ray radiated from the fusion splice portion with an infrared analysis apparatus (thermography apparatus).

However, with the structure disclosed in Patent Literature 1, since the fusion splice portion is covered with a resin and a reinforcing sleeve, infrared rays radiated from the fusion splice portion are blocked by the resin and the reinforcing sleeve. Therefore, it is difficult to accurately measure infrared rays radiated from the fusion splice portion with an infrared analysis apparatus. Even if unusual heat generation is caused in the fusion splice portion, the infrared analysis apparatus cannot detect an increase of the temperature of the fusion splice portion. Accordingly, any defects may be unable to be detected at the fusion splice portion within a range of the rated output. In some cases, unusual heat generation may be found only when the optical fibers are burnt out.

PRIOR ART LITERATURE

Patent Literature

Patent Literature 1: JP 2009-115918 A

SUMMARY OF THE INVENTION

Problem(s) to be Solved by the Invention

The present invention has been made in view of the above drawbacks in the prior art. It is, therefore, a first object of the present invention to provide an optical fiber fusion splice structure capable of reinforcement of optical fibers, prevention of light leakage, and detection of unusual heat generation with low-output light at a fusion splice portion and in the vicinity of the fusion splice portion.

Furthermore, a second object of the present invention is to provide a method of manufacturing a laser apparatus that exhibits good characteristics to detect unusual heat generation with low-output light in an optical fiber fusion splice structure capable of reinforcement of optical fibers and prevention of light leakage at a fusion splice portion and in the vicinity of the fusion splice portion.

Means for Solving Problem(s)

According to a first aspect of the present invention, there is provided an optical fiber fusion splice structure capable of reinforcement of optical fibers, prevention of light leakage, and detection of unusual heat generation with low-output light at a fusion splice portion and in the vicinity of the fusion splice portion. This optical fiber fusion splice structure is used to connect at least two optical fibers having a bare fiber and a covering that covers the bare fiber to each other by fusion splicing. The optical fiber fusion splice structure has a fusion splice portion at which the bare fibers exposed from the coverings are connected to each other by fusion splicing, a fiber accommodation portion having a fiber accommodation groove formed along an axis of the optical fibers, and fixation resins for fixing a portion of the coverings on both sides of the fusion splice portion within the fiber accommodation groove. The fiber accommodation groove receives a portion of the optical fibers including the fusion splice portion. The fixation resins are formed so as to fill the fiber accommodation groove in a depth direction. The optical fiber fusion splice structure has a pipe member attached around the fiber accommodation portion so as to surround a space between the fixation resins on both sides of the fusion splice portion within the fiber accommodation groove. The pipe member allows an infrared ray to pass therethrough.

Thus, the fusion splice portion of the optical fibers and the bare fibers in the vicinity of the fusion splice portion are received within the fiber accommodation groove of the fiber accommodation portion. Therefore, the fusion splice portion and the bare fibers in the vicinity of the fusion splice portion can be reinforced and protected from external forces by the fiber accommodation portion. Furthermore, since the pipe member surrounds the space between the fixation resins on both sides of the fusion splice portion within the fiber accommodation groove, a hermetically sealed space can be formed within the fiber accommodation groove where the fusion splice portion is disposed. Accordingly, a foreign material from an exterior of the hermetically sealed space is prevented from attaching to the bare fiber exposed from the covering of the optical fiber, and light is prevented from leaking from a foreign material that would attach to the bare fibers of the optical fibers.

Furthermore, the pipe member allows an infrared ray to pass therethrough. Therefore, when heat is generated in the optical fiber within the hermetically sealed space, an infrared ray produced by the generated heat passes through the pipe member and radiates externally. Accordingly, the temperature of the optical fibers at the fusion splice portion and in the vicinity of the fusion splice portion can be measured by detecting the infrared ray with an infrared analysis apparatus (thermography apparatus) or the like after the fusion splice portion and the vicinity thereof have been reinforced by the fiber accommodation portion as described above. Thus, unusual heat generation of the optical fibers can be detected at the fusion splice portion and in the vicinity thereof.

Moreover, light is likely to leak at boundaries between the bare fibers exposed from the coverings and the coverings or at the fusion splice portion. Therefore, an air cladding may preferably be formed between those portions and an inner surface of the fiber accommodation groove.

The fiber accommodation portion may have a shape of a rectangular parallelepiped in which the fiber accommodation groove has been formed. Furthermore, at least one of the optical fibers may be used to transmit pump light from a pump light source.

According to a second aspect of the present invention, there is provided a method of manufacturing a laser apparatus that exhibits good characteristics to detect unusual heat generation with low-output light in an optical fiber fusion splice structure capable of reinforcement of optical fibers and prevention of light leakage at a fusion splice portion and in the vicinity of the fusion splice portion. This method is used to manufacture a laser apparatus including an optical fiber fusion splice structure in which at least two optical fibers having a bare fiber and a covering that covers the bare fiber are connected to each other by fusion splicing. This method includes connecting the bare fibers exposed from the coverings to each other by fusion splicing to form a fusion splice portion, receiving a portion of the optical fibers including the fusion splice portion within a fiber accommodation groove formed in a fiber accommodation portion along an axis of the optical fibers, and forming fixation resins so as to fill the fiber accommodation groove in a depth direction on both sides of the fusion splice portion in a state in which the optical fibers are held within the fiber accommodation groove, for fixing the coverings of the optical fibers within the fiber accommodation groove. Furthermore, the method includes attaching, around the fiber accommodation portion, a pipe member that allows an infrared ray to pass therethrough so as to surround a space between the fixation resins on both sides of the fusion splice portion within the fiber accommodation groove, connecting a laser source to at least one of the optical fibers so that a laser beam propagates through the optical fibers from the laser source, and measuring an infrared ray transmitting through the pipe member while the laser beam propagating through the optical fibers. A completion of the apparatus is determined by verifying that the measured infrared ray is not more than a predetermined threshold.

According to this method, it is possible to manufacture a laser apparatus including an optical fiber fusion splice structure capable of reinforcement of optical fibers and prevention of light leakage at a fusion splice portion and in the vicinity of the fusion splice portion as described above. Furthermore, the pipe member allows an infrared ray to pass therethrough. Therefore, when heat is generated in the optical fiber at the fusion splice portion and in the vicinity thereof, an infrared ray produced by the generated heat passes through the pipe member and radiates externally. Accordingly, the infrared ray can be detected with an infrared analysis apparatus (thermography apparatus) after the fusion splice portion and the vicinity thereof have been reinforced by the fiber accommodation portion. As a result, the temperature of the optical fibers at the fusion splice portion and in the vicinity of the fusion splice portion can be measured to detect unusual heat generation of the optical fibers at the fusion splice portion and in the vicinity thereof with low-output light. When a completion of the apparatus is determined by verifying that the measured infrared ray is not more than a predetermined threshold, any laser apparatus including an optical fiber that may cause unusual heat generation can be excluded as a defective product. Thus, a laser apparatus that exhibits good characteristics can be manufactured.

Advantageous Effects of the Invention

According to the present invention, the fusion splice portion of the optical fibers and the bare fibers in the vicinity of the fusion splice portion are received within the fiber accommodation groove of the fiber accommodation portion. Therefore, the fusion splice portion and the bare fibers in the vicinity of the fusion splice portion can be reinforced and protected from external forces by the fiber accommodation portion. Furthermore, since the pipe member surrounds the space between the fixation resins on both sides of the fusion splice portion within the fiber accommodation groove, a hermetically sealed space can be formed within the fiber accommodation groove where the fusion splice portion is disposed. Accordingly, a foreign material from an exterior of the hermetically sealed space is prevented from attaching to the bare fiber exposed from the covering of the optical fiber, and light is prevented from leaking from a foreign material that would attach to the bare fibers of the optical fibers.

Furthermore, the pipe member allows an infrared ray to pass therethrough. Therefore, when heat is generated in the optical fiber within the hermetically sealed space, an infrared ray produced by the generated heat passes through the pipe member and radiates externally. Accordingly, the temperature of the optical fibers at the fusion splice portion and in the vicinity of the fusion splice portion can be measured by detecting the infrared ray with an infrared analysis apparatus (thermography apparatus) or the like after the fusion splice portion and the vicinity thereof have been reinforced by the fiber accommodation portion. Thus, unusual heat generation of the optical fibers can be detected at the fusion splice portion and in the vicinity thereof.

MODE(S) FOR CARRYING OUT THE INVENTION

An embodiment of an optical fiber fusion splicing structure and a method of manufacturing a laser device including an optical fiber fusion splice structure according to the present invention will be described in detail below with reference to FIGS. 1 to 7. In FIGS. 1 to 7, the same or corresponding components are denoted by the same or corresponding reference numerals and will not be described below repetitively. Furthermore, in FIGS. 1 to 7 the scales or dimensions of components may be exaggerated, or some components may be omitted.

Figure 1:
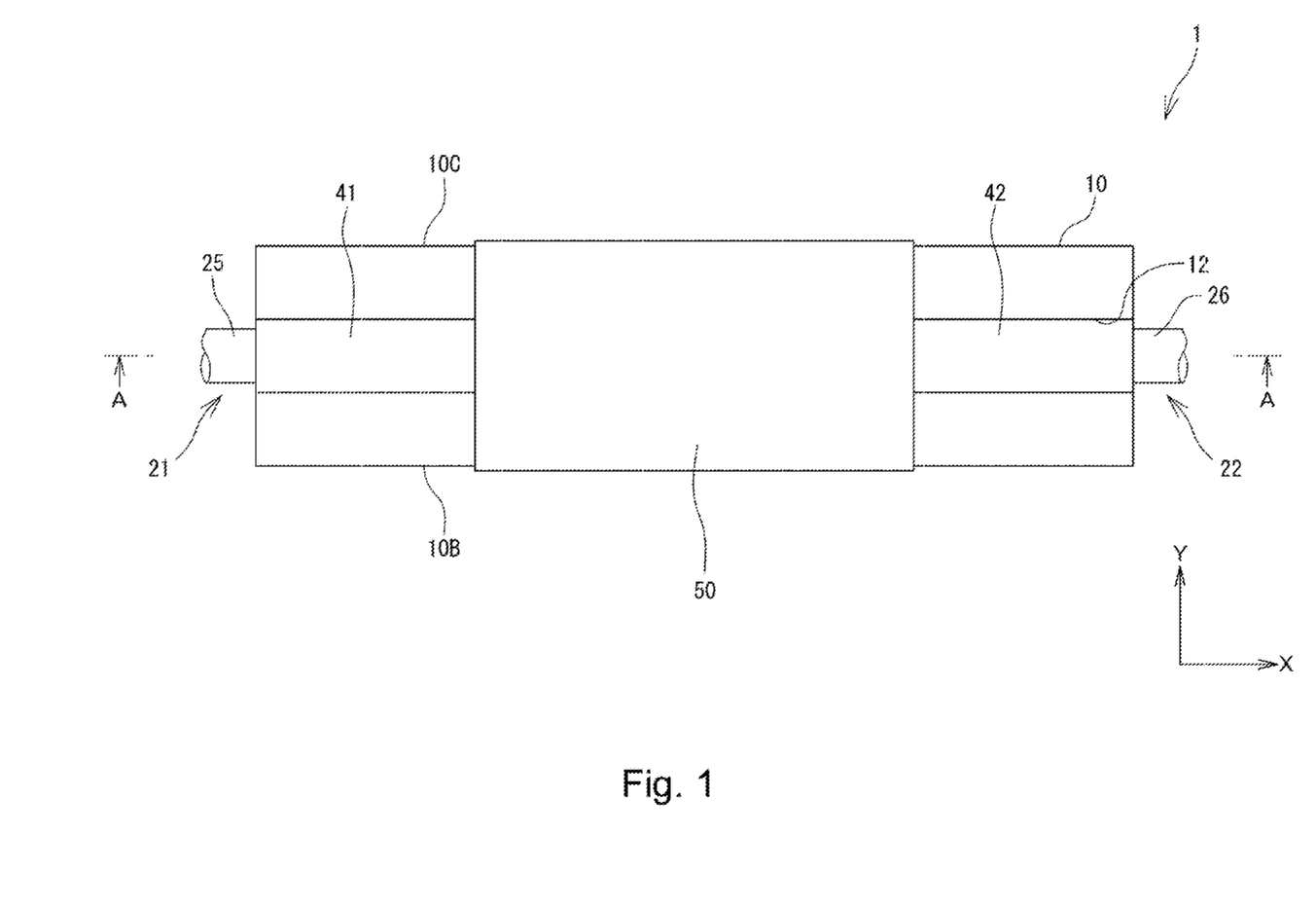
FIG. 1 is a plan view schematically showing an optical fiber fusion splice structure according to an embodiment of the present invention.
Figure 2:
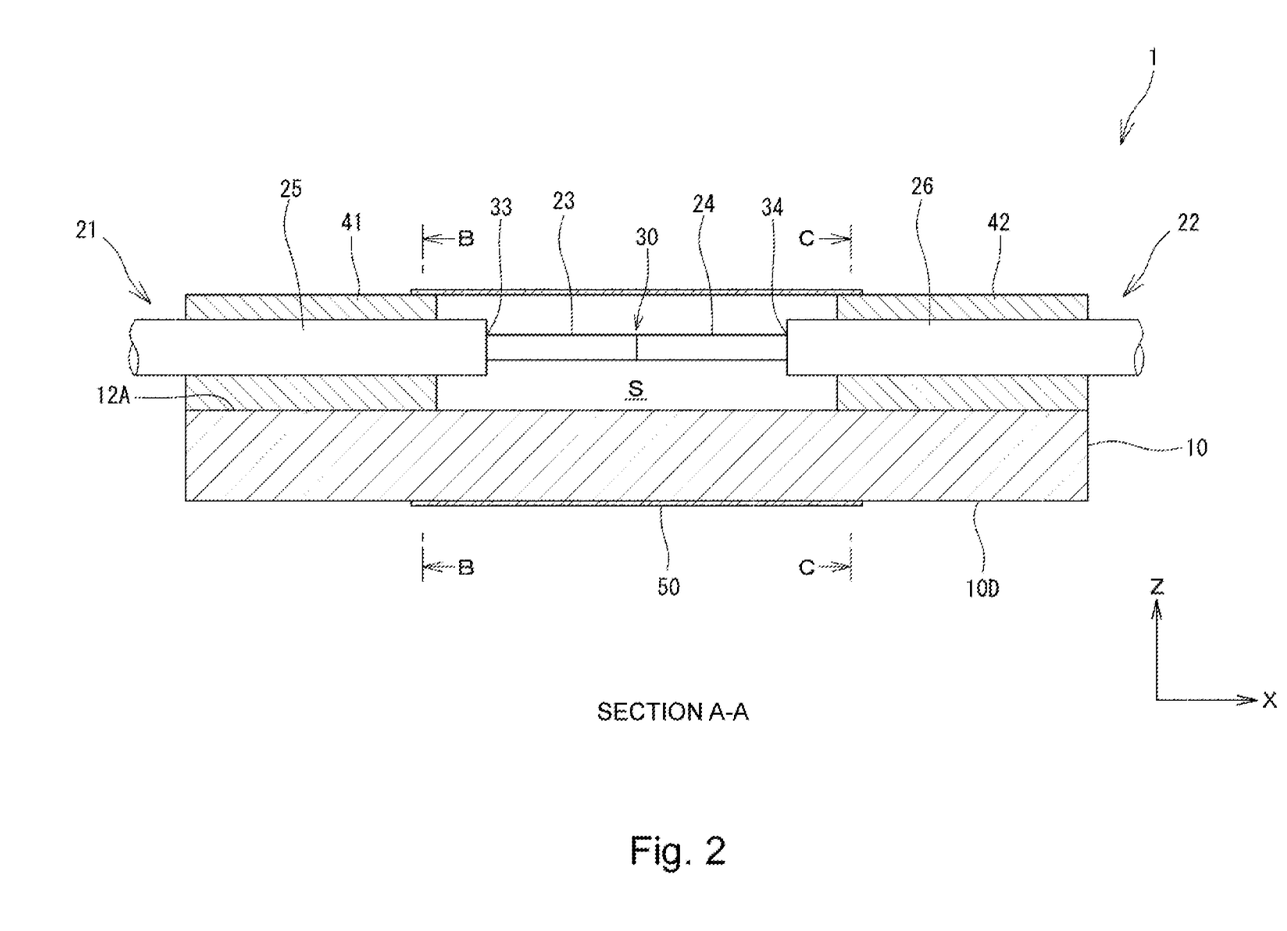
FIG. 2 is a cross-sectional view of the optical fiber fusion splice structure taken along line A-A of FIG. 1.
Figure 3:
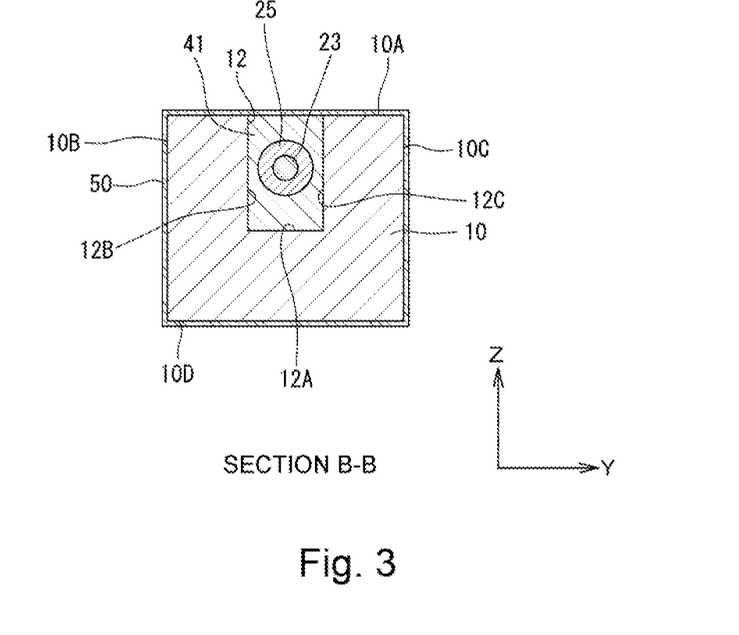
FIG. 3 is a cross-sectional view of the optical fiber fusion splice structure taken along line B-B of FIG. 2.
Figure 4:
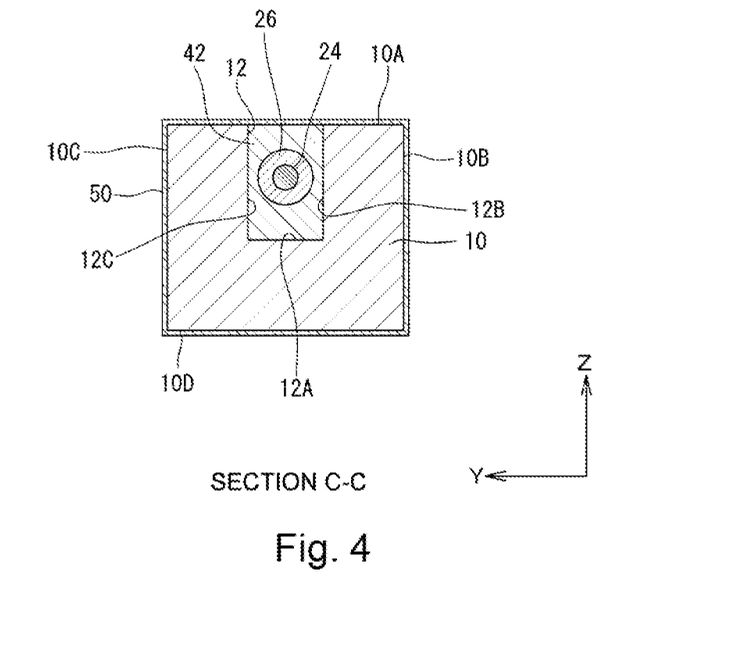
FIG. 4 is a cross-sectional view of the optical fiber fusion splice structure taken along line C-C of FIG. 2.
Figure 5:
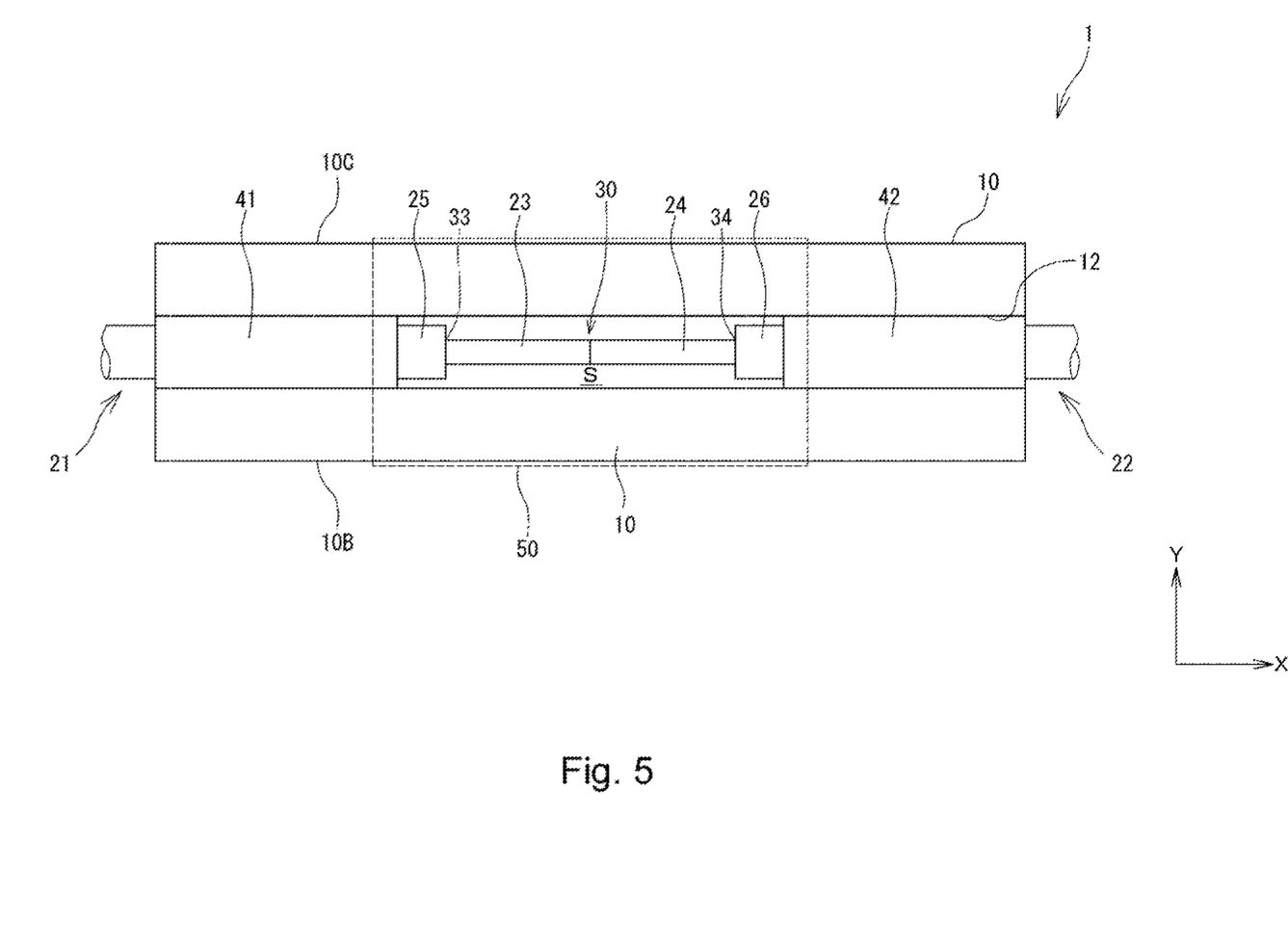
FIG. 5 is a plan view of the optical fiber fusion splice structure illustrated in FIG. 1 as seen through a pipe member.

FIG. 1 is a plan view schematically showing an optical fiber fusion splice structure 1 according to an embodiment of the present invention, FIG. 2 is a cross-sectional view taken along line A-A of FIG. 1, FIG. 3 is a cross-sectional view taken along line B-B of FIG. 2, FIG. 4 is a cross-sectional view taken along line C-C of FIG. 2, and FIG. 5 is a plan view as seen through a pipe member 50, which will be described later. As shown in FIGS. 1 to 5, the optical fiber fusion splice structure 1 of this embodiment is to connect two optical fibers 21 and 22 extending along the X-direction to each other by fusion splicing. The optical fiber 21 has a bare fiber 23, which includes a core and a cladding, and a covering 25 that covers the bare fiber 23. The optical fiber 22 has a bare fiber 24, which includes a core and a cladding, and a covering 26 that covers the bare fiber 24. In FIG. 2, for the sake of brevity, the cross-sections of the optical fibers 21 and 22 are omitted from the illustration. Each of the optical fibers 21 and 22 may be a single-cladding fiber or a fiber having two or more cladding layers.

As shown in FIG. 2, the covering 25 of the optical fiber 21 is removed by a predetermined distance from an end of the optical fiber 21, so that the bare fiber 23 is exposed from the covering 25. Similarly, the covering 26 of the optical fiber 22 is removed by a predetermined distance from an end of the optical fiber 22, so that the bare fiber 24 is exposed from the covering 26. The exposed bare fibers 23 and 24 of the optical fibers 21 and 22 are connected to each other by fusion splicing to thereby form a fusion splice portion 30.

As shown in FIGS. 1 to 5, the optical fiber fusion splice structure 1 has a fiber accommodation portion 10 in the form of a generally rectangular parallelepiped. A fiber accommodation groove 12 extending along an axial direction of the optical fibers 21 and 22 (X-direction) is formed in the fiber accommodation portion 10. In other words, as shown in FIGS. 3 and 4, the fiber accommodation groove 12 forms a U-shaped cross-section on the YZ-plane in the fiber accommodation portion 10. The fiber accommodation groove 12 receives portions of the optical fibers 21 and 22 including the aforementioned fusion splice portion 30. It is preferable to form the fiber accommodation portion 10 of a material having a high thermal conductivity (e.g., aluminum nitride).

The optical fiber 21 is fixed within the fiber accommodation groove 12 by a fixation resin 41, which is formed within the fiber accommodation groove 12. The optical fiber 22 is fixed within the fiber accommodation groove 12 by a fixation resin 42, which is formed within the fiber accommodation groove 12. Those fixation resins 41 and 42 are located on both sides of the fusion splice portion 30 along the X-direction. The fixation resin 41 is to fix the covering 25 of the optical fiber 21, and the fixation resin 42 is to fix the covering 26 of the optical fiber 22. The fixation resin 41 may preferably have a refractive index that is equal to or lower than the cladding of the optical fiber 21, and the fixation resin 42 may preferably have a refractive index that is equal to or lower than the cladding of the optical fiber 22.

As shown in FIG. 3, the fixation resin 41 is formed so that the fiber accommodation groove 12 is filled with the fixation resin 41 in the depth direction (Z-direction), that is, the fixation resin 41 is formed from a bottom surface 12A of the fiber accommodation groove 12 to the height of an upper surface 10A of the fiber accommodation portion 10. Furthermore, as shown in FIG. 4, the fixation resin 42 is formed so that the fiber accommodation groove 12 is filled with the fixation resin 42 in the depth direction (Z-direction), that is, the fixation resin 42 is formed from the bottom surface 12A of the fiber accommodation groove 12 to the height of the upper surface 10A of the fiber accommodation portion 10. In the illustrated example, surfaces of the fixation resins 41 and 42 are illustrated as being on the same plane as the upper surface 10A of the fiber accommodation portion 10. Nevertheless, the fixation resins 41 and 42 may be swelled to any location higher than the upper surface 10A of the fiber accommodation portion 10 as long as the pipe member 50 is brought into intimate contact with surfaces of the fixation resins 41 and 42 and outer surfaces 10A, 10B, 10C, and 10D of the fiber accommodation portion 10 to form a hermetically sealed space S within the fiber accommodation groove 12 as described below.

As shown in FIGS. 1 to 4, the pipe member 50 is attached around the fiber accommodation portion 10. The pipe member 50 extends along the X-direction so as to connect the fixation resin 41 and the fixation resin 42 to each other. The pipe member 50 is attached around the fiber accommodation portion 10 in a state in which the pipe member 50 is brought into intimate contact with the surfaces of the fixation resins 41 and 42 and the outer surfaces 10A, 10B, 10C, and 10D of the fiber accommodation portion 10. By the pipe member 50 thus configured, the hermetically sealed space S is formed within the fiber accommodation groove 12 where the fusion splice portion 30 is disposed. For example, a heat-shrinkable tube may be used as the pipe member 50.

The bare fiber 23 exposed from the covering 25 of the optical fiber 21, the bare fiber 24 exposed from the covering 26 of the optical fiber 22, a portion of the covering 25 of the optical fiber 21, and a portion of the covering 26 of the optical fiber 22 are located inside of the hermetically sealed space S formed by the pipe member 50. Therefore, a foreign material from an exterior of the hermetically sealed space S is prevented from attaching to the bare fiber 23 or the bare fiber 24. Light is effectively prevented from leaking from a foreign material that would attach to the bare fibers 23 and 24 of the optical fibers.

Furthermore, the air within the hermetically sealed space S forms an air cladding between the bare fiber 23 exposed from the covering 25 of the optical fiber 21 and inner surfaces 12A, 12B, and 12C of the fiber accommodation groove 12 (see FIGS. 3 and 4) and between the bare fiber 24 exposed from the covering 26 of the optical fiber 22 and the inner surfaces 12A, 12B, and 12C of the fiber accommodation groove 12. Such an air cladding prevents light propagating through the optical fibers 21 and 22 from leaking out of the optical fibers 21 and 22. Particularly, light is likely to leak at boundaries 33 and 34 between the exposed bare fibers 23, 24 and the coverings 25, 26 or at the fusion splice portion 30. An air cladding may preferably be formed between those portions and the inner surfaces 12A, 12B, and 12C of the fiber accommodation groove 12. With the air cladding thus formed, if a foreign material should attach to the exposed bare fiber 23 or 24 to cause light to leak into the foreign material and generate heat, no inflammables are present around the foreign material. Therefore, the optical fibers 21 and 22 are less likely to be burnt out.

Meanwhile, the pipe member 50 is formed of a material that allows an infrared ray to pass therethrough. Examples of such a material include fluorinated ethylene-propylene copolymer (FEP) and the like. The infrared transmittance of the pipe member 50 may preferably be at least 80%. With use of the pipe member 50 thus configured, when heat is generated in the optical fiber 21 or 22 within the hermetically sealed space S, infrared rays produced by the generated heat radiate externally through the pipe member 50. Therefore, the temperature of the optical fibers 21 and 22 at the fusion splice portion 30 and in the vicinity of the fusion splice portion 30 can be measured by detecting the infrared ray with an infrared analysis apparatus (thermography apparatus) or the like.

According to the present embodiment, the fusion splice portion 30 of the optical fibers 21 and 22 and the bare fibers 23 and 24 in the vicinity of the fusion splice portion 30 are received within the fiber accommodation groove 12 of the fiber accommodation portion 10. The fusion splice portion 30 and the bare fibers 23 and 24 in the vicinity of the fusion splice portion 30 can be reinforced and protected from external forces by the fiber accommodation portion 10. Furthermore, since the optical fibers 21 and 22 are held within the fiber accommodation groove 12 of the fiber accommodation portion 10, the distance between the infrared analysis apparatus and the optical fibers 21 and 22 can readily be made constant. Therefore, infrared rays can be measured more accurately with the infrared analysis apparatus. Particularly, since the fiber accommodation groove 12 is formed in the fiber accommodation portion 10 that is in the form of a rectangular parallelepiped, the distance from a bottom surface 10D of the fiber accommodation portion 10 to the optical fibers 21 and 22 can readily be made constant. Accordingly, when the bottom surface 10D of the fiber accommodation portion 10 is placed on a plane, the distance between the infrared analysis apparatus and the optical fibers 21 and 22 can readily be made constant. Thus, infrared rays can be measured more accurately with the infrared analysis apparatus.

The above embodiment describes a case where two optical fibers 21 and 22 are connected to each other by fusion splicing. The present invention may be applied to cases where three or more optical fibers are connected to each other by fusion splicing.

Figure 6A:
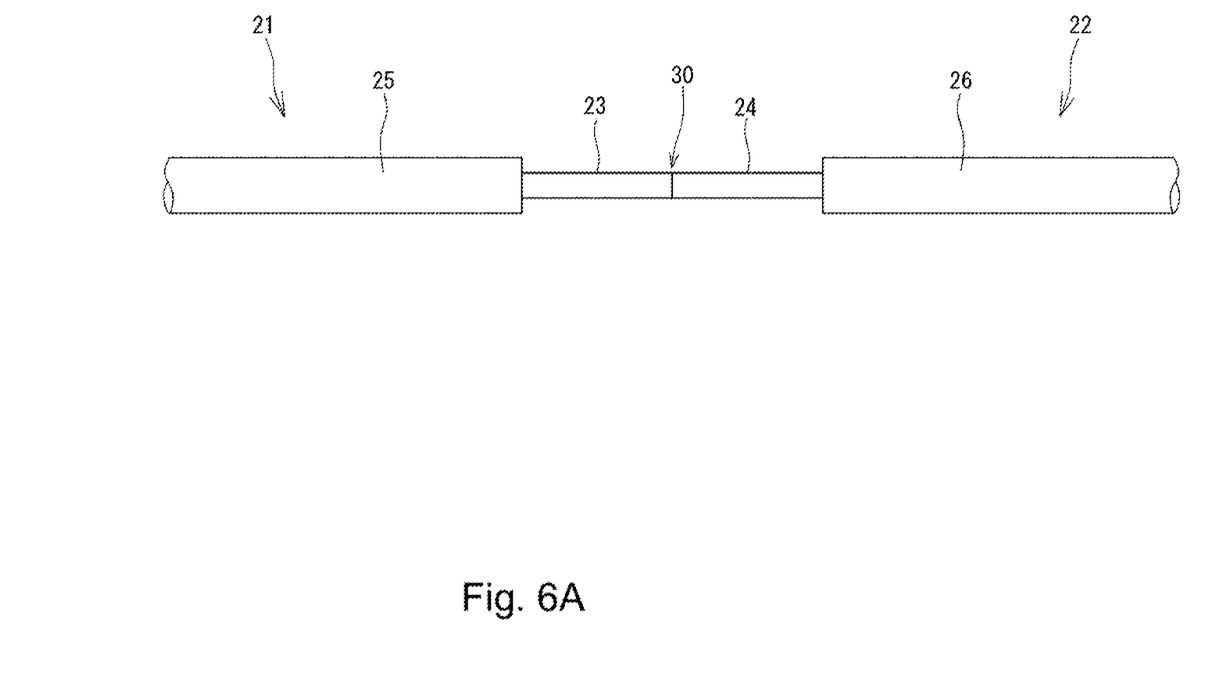
FIG. 6A is a cross-sectional view showing a manufacturing process of a laser apparatus including an optical fiber fusion splice structure according to an embodiment of the present invention.

Next, a method of manufacturing a laser apparatus including an optical fiber fusion splice structure having the above configuration will be described below with reference to FIGS. 6A to 6C. First, as shown in FIG. 6A, an optical fiber 21 in which a covering 25 has been removed over a predetermined distance from an end of the optical fiber 21 so that a bare fiber 23 is exposed is prepared, and an optical fiber 22 in which a covering 26 has been removed over a predetermined distance from an end of the optical fiber 22 so that a bare fiber 24 is exposed is prepared. The exposed bare fibers 23 and 24 are opposed to each other and connected to each other by fusion splicing to form a fusion splice portion 30.

Figure 6B:
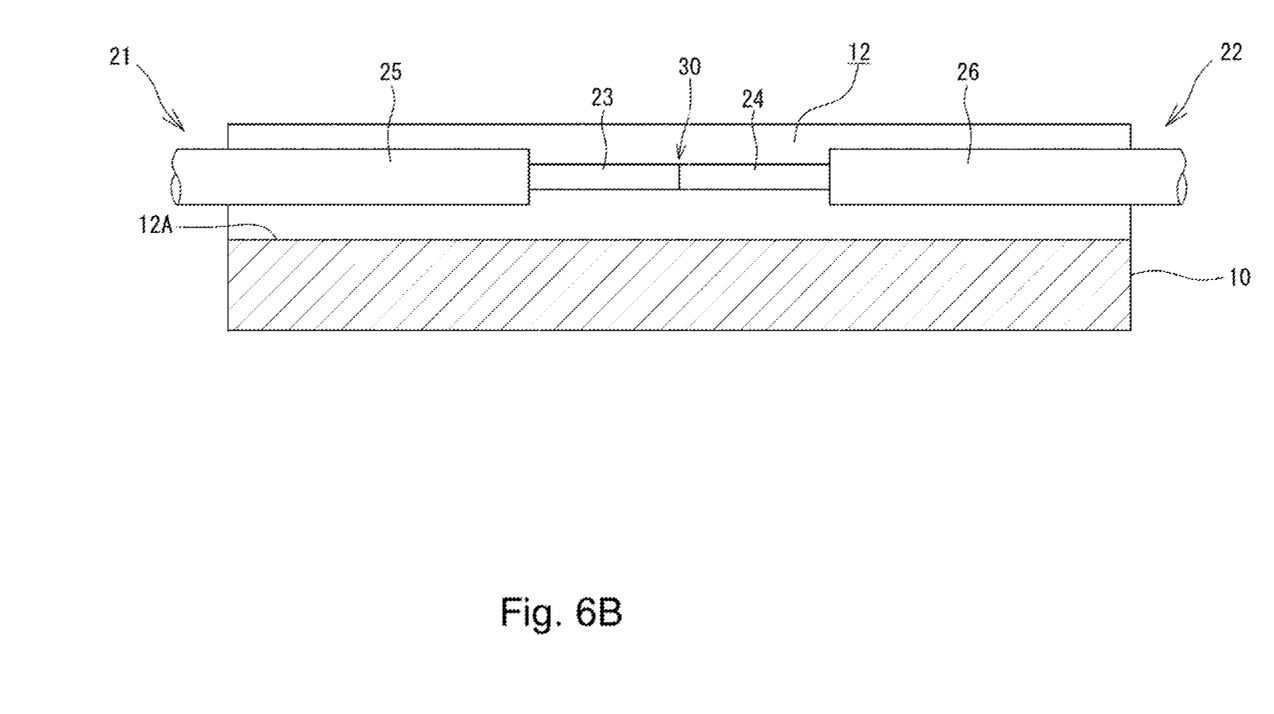
FIG. 6B is a cross-sectional view showing a manufacturing process of a laser apparatus including an optical fiber fusion splice structure according to the embodiment of the present invention.

As shown in FIG. 6B, the optical fibers 21 and 22 including the fusion splice portion 30 thus formed is accommodated into the fiber accommodation groove 12 of the fiber accommodation portion 10. At that time, in order to avoid any influence such as vibration on the optical fibers 21 and 22 from the fiber accommodation portion 10, it is preferable to hold the optical fibers 21 and 22 such that the optical fibers 21 and 22 are out of contact with the bottom surface 12A and the side surfaces 12B and 12C of the fiber accommodation groove 12 (see FIGS. 3 and 4). Furthermore, in order to encourage infrared rays produced by heat generation to reach the infrared analysis apparatus 70 (see FIG. 6E) as described later, the optical fibers 21 and 22 may be located above the center of the fiber accommodation groove 12 in the Z-direction to reduce the distance between the optical fibers 21, 22 and the infrared analysis apparatus 70.

Figure 6C:
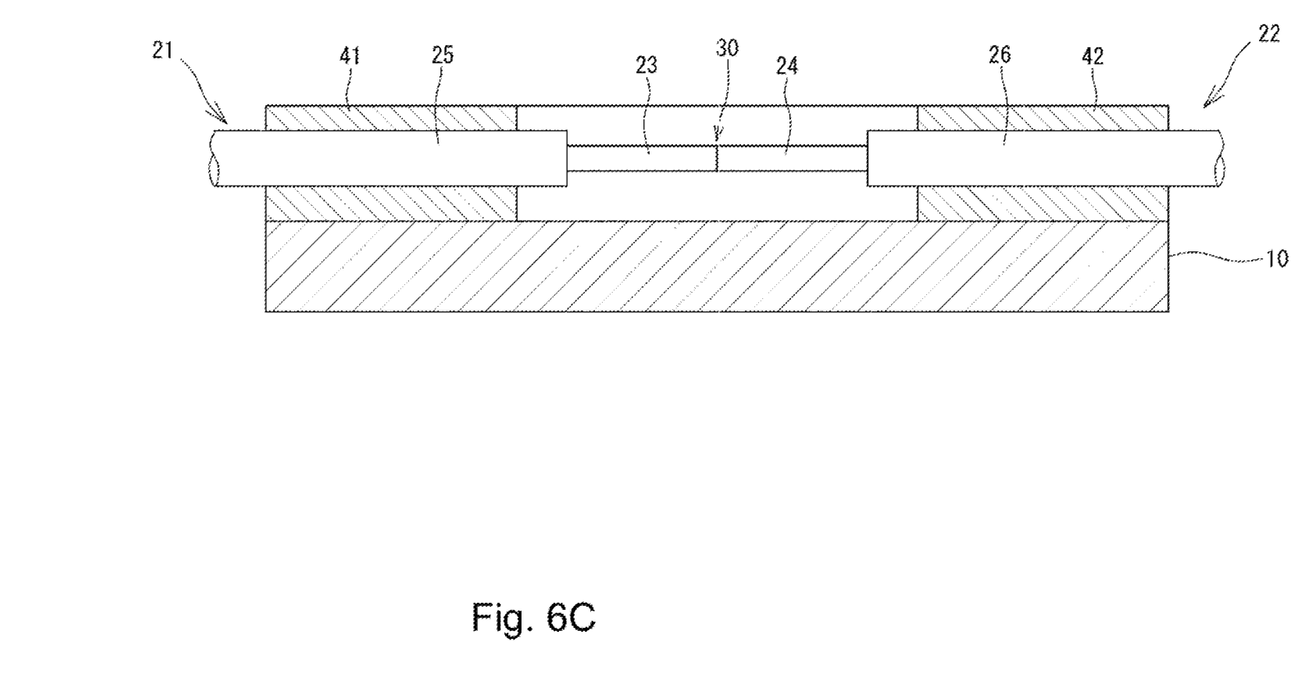
FIG. 6C is a cross-sectional view showing a manufacturing process of a laser apparatus including an optical fiber fusion splice structure according to the embodiment of the present invention.

Then, as shown in FIG. 6C, a fixation resin 41 is filled into one end of the fiber accommodation groove 12 to fix a portion of the covering 25 of the optical fiber 21 within the fiber accommodation groove 12. Similarly, a fixation resin 42 is filled into another end of the fiber accommodation groove 12 to fix a portion of the covering 26 of the optical fiber 22 within the fiber accommodation groove 12. Thus, the optical fibers 21 and 22 are fixed within the fiber accommodation groove 12 in a state in which the fusion splice portion 30 is located within the fiber accommodation groove 12.

Figure 6D:
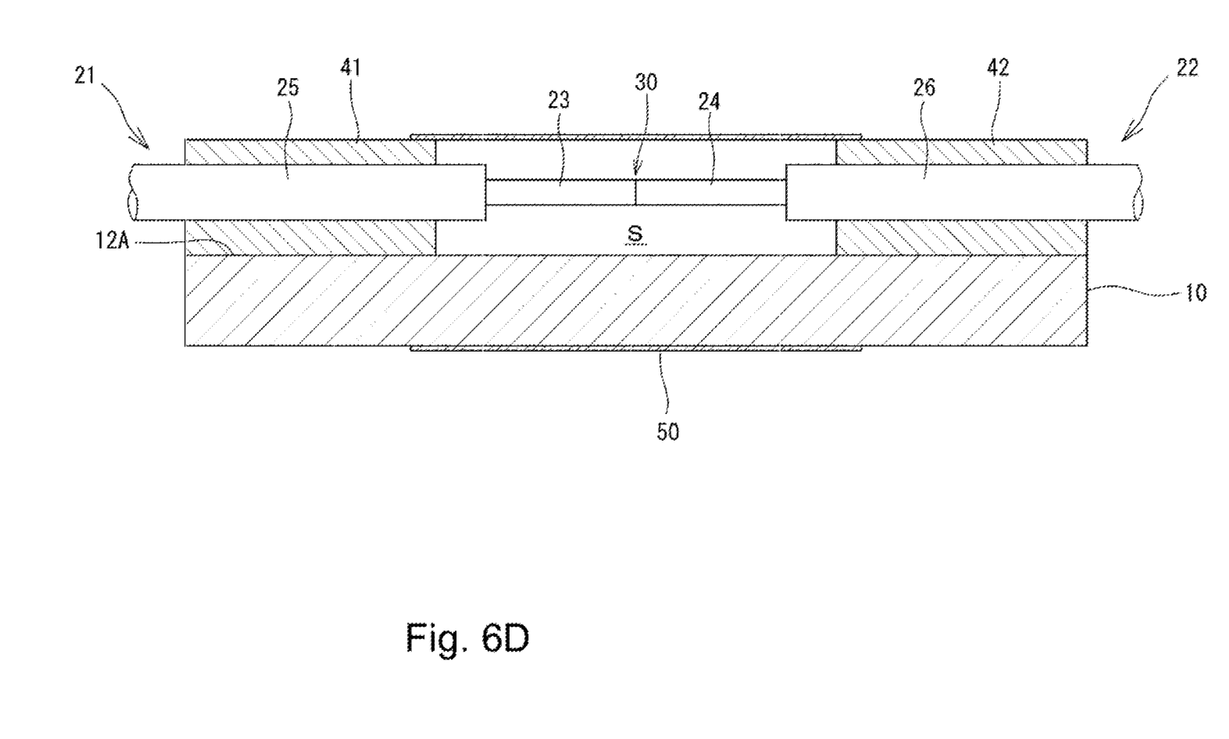
FIG. 6D is a cross-sectional view showing a manufacturing process of a laser apparatus including an optical fiber fusion splice structure according to the embodiment of the present invention.

Thereafter, as shown in FIG. 6D, a heat-shrinkable tube as the pipe member 50 is moved from an end of the optical fibers 21 and 22 to the fiber accommodation portion 10. The heat-shrinkable tube 50 is heated, for example, with a hot plate or a heating tool. Thus, the heat-shrinkable tube 50 shrinks so that it is brought into intimate contact with surfaces of the fixation resins 41 and 42 and outer surfaces 10A, 10B, 10C, and 10D of the fiber accommodation portion 10 (see FIGS. 3 and 4). The shrinkage of the heat-shrinkable tube 50 forms a hermetically sealed space S within the fiber accommodation groove 12 in which the fusion splice portion 30 is disposed. In this manner, an air cladding is formed between the bare fiber 23 exposed from the covering 25 of the optical fiber 21 and the bare fiber 24 exposed from the covering 26 of the optical fiber 22 and the inner surfaces 12A, 12B, and 12C of the fiber accommodation groove 12.

Figure 6E:
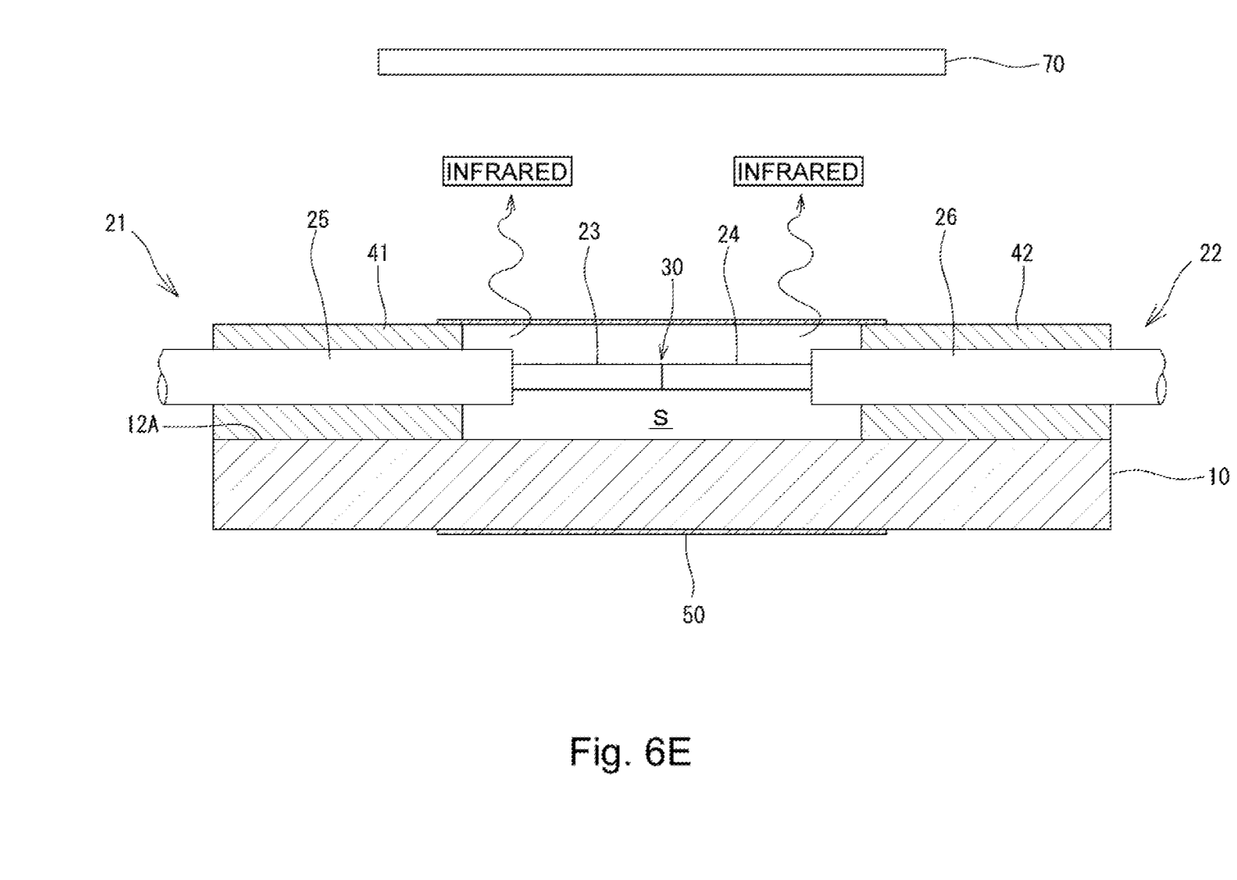
FIG. 6E is a cross-sectional view showing a manufacturing process of a laser apparatus including an optical fiber fusion splice structure according to the embodiment of the present invention.

Next, one of the optical fibers 21 and 22 is connected to a laser source (e.g., a semiconductor laser diode). The light source is operated under the same conditions as those in a normal operation or under different conditions than those in a normal operation so that a laser beam propagates through the optical fibers 21 and 22. At that time, as shown in FIG. 6E, an infrared analysis apparatus (thermography apparatus) 70 is disposed above the fusion splice portion 30. Infrared rays radiated from the optical fibers 21 and 22 are measured with the infrared analysis apparatus 70 to measure the temperature of the optical fibers 21 and 22.

If unusual heat generation is caused in the fusion splice portion 30 of the optical fibers 21 and 22 or in the vicinity of the fusion splice portion 30, then an infrared ray having a higher energy than an ambient energy is radiated from the heat generation portion. However, since the pipe member 50 is formed of a material through which an infrared ray transmits, the high-energy infrared ray transmits through the pipe member 50 and reaches the infrared analysis apparatus 70. Therefore, even in a case where the laser source has a low output, the infrared analysis apparatus 70 can detect a temperature increase at the fusion splice portion 30 or in the vicinity of the fusion splice portion 30. Accordingly, unusual heat generation can be detected at those portions.

More specifically, it is determined whether or not the amount of the infrared rays measured by the infrared analysis apparatus 70 is equal to or less than a predetermined threshold (whether or not the temperature is equal to or less than a predetermined threshold). If the amount of the infrared rays exceeds the predetermined threshold, it is determined that a temperature increase is being caused by unusual heat generation of the optical fibers 21 and 22. Therefore, re-inspection or reassembly of the laser apparatus being fabricated is conducted. If the amount of the infrared rays measured by the infrared analysis apparatus 70 is equal to or less than the predetermined threshold, then the laser apparatus is determined as a non-defective product and thus completed.

Figure 7:
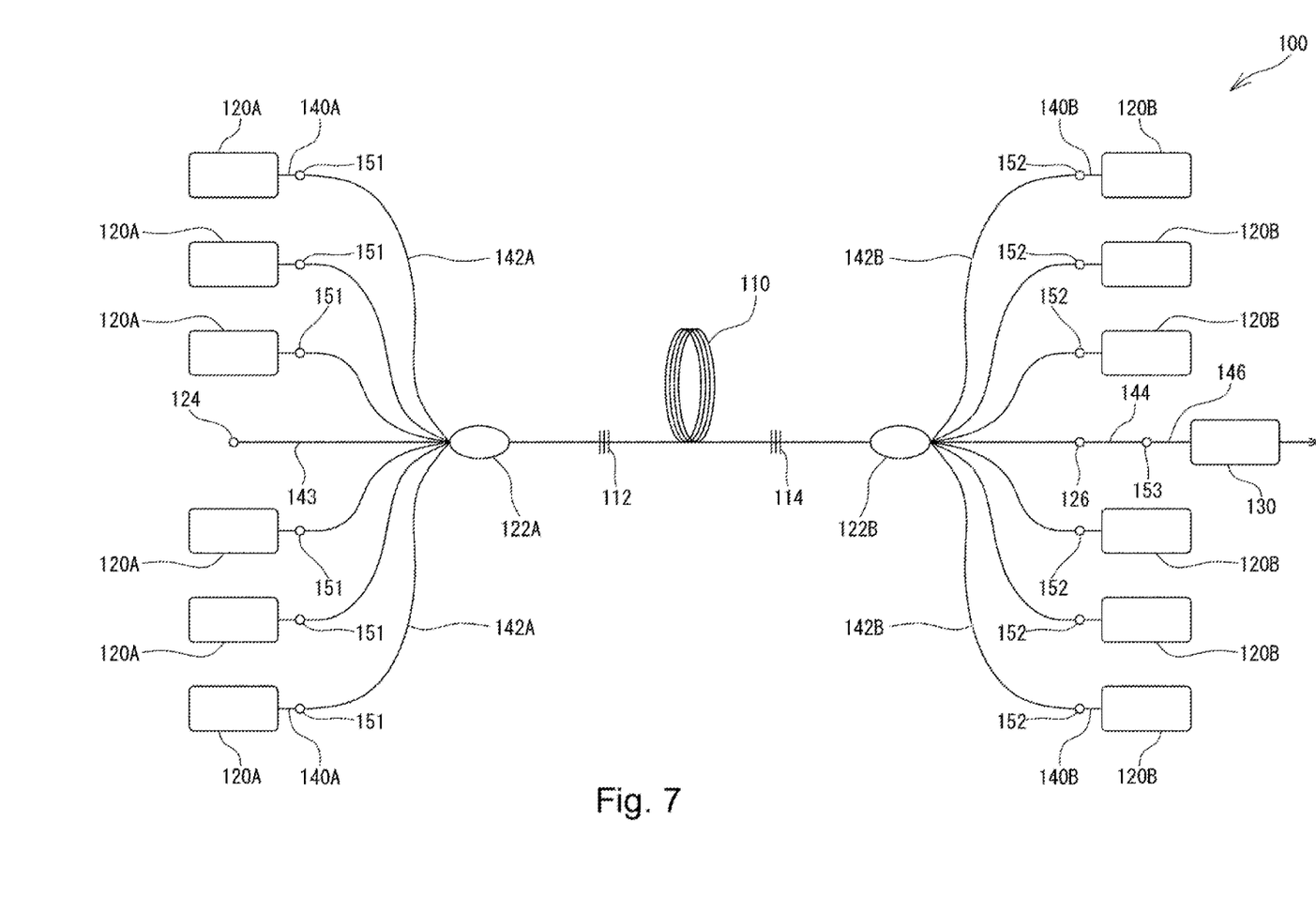
FIG. 7 is a block diagram schematically showing a fiber laser apparatus to which an optical fiber fusion splice structure according to the present invention can be applied.

The aforementioned optical fiber fusion splice structure 1 can be applied to various types of laser apparatuses. FIG. 7 is a block diagram schematically showing a fiber laser apparatus 100 to which the aforementioned optical fiber fusion splice structure 1 can be applied. This fiber laser apparatus 100 has an amplifying optical fiber 110 that has been doped, for example, with a rare earth element such as Yb (ytterbium), a plurality of rear pump light sources 120A operable to introduce pump light into the amplifying optical fiber 110 from a rear side of the amplifying optical fiber 110, an optical combiner 122A operable to combine pump light beams from the rear pump light sources 120A, a plurality of front pump light sources 120B operable to introduce pump light into the amplifying optical fiber 110 from a front side of the amplifying optical fiber 110, an optical combiner 122B operable to combine pump light beams from the front pump light sources 120B, and a laser emission portion 130 operable to emit an output laser beam from the amplifying optical fiber 110, for example, toward a workpiece. A high-reflectivity fiber bragg grating (FBG) 112 is formed on a front side of the amplifying optical fiber 110, and a low-reflectivity FBG 114 is formed on a rear side of the amplifying optical fiber 110. For example, the amplifying optical fiber 110 has a double cladding structure including an inner cladding and an outer cladding having a refractive index lower than that of the inner cladding. The high-reflectivity FBG 112, the amplifying optical fiber 110, and the low-reflectivity FBG 114 form a resonator operable to generate a laser oscillation state.

For example, a high-power multi-mode semiconductor laser (LD) with a wavelength of 915 nm can be used for the pump light sources 120A and 120B. Pump light beams from the rear pump light sources 120A are combined by the optical combiner 122A and introduced into the inner cladding of the amplifying optical fiber 110 from the high-reflectivity FBG 112. Similarly, pump light beams from the front pump light sources 120B are combined by the optical combiner 122B and introduced into the inner cladding of the amplifying optical fiber 110 from the low-reflectivity FBG 114.

An optical fiber 143 having a core, which is optically coupled to the core of the amplifying optical fiber 110, extends from the optical combiner 122A. A heat dissipation portion 124 for converting light into heat is provided on an end of the optical fiber 143. A heat dissipation portion 126 for converting light that has leaked from the optical fiber into heat is provided between the optical combiner 122B and the laser emission portion 130.

The pump light beam emitted from each of the pump light sources 120A is transmitted through the optical fibers 140A and 142A, combined with the other pump light beams at the optical combiner 122A, and introduced into the amplifying optical fiber 110 so as to propagate primarily through the inner cladding. Furthermore, the pump light beam emitted from each of the pump light sources 120B is transmitted through the optical fibers 140B and 142B, combined with the other pump light beams at the optical combiner 122B, and introduced into the amplifying optical fiber 110 so as to propagate primarily through the inner cladding.

The pump light propagating through the inner cladding of the amplifying optical fiber 110 excites an active element doped in the core when it passes through the core. The active element in the excited energy state causes spontaneous emission in a specific wavelength bandwidth. Light having a wavelength in the spontaneous emission that is reflected by the high-reflectivity FBG 112 and the low-reflectivity FBG 114 is reciprocated between the high-reflectivity FBG 112 and the low-reflectivity FBG 114. When the light transmits through the core of the amplifying optical fiber 110, the active element in the excited energy state causes stimulated emission, which is amplified. When the optical gain and loss of the amplified light are equal to each other within the resonator, a laser oscillation state is established. A portion of the oscillated laser beam is transmitted through the low-reflectivity FBG 114 and outputted from the laser emission portion 130.

For example, in such a fiber laser apparatus 100, the aforementioned optical fiber fusion splice structure 1 can be applied to the following portions.

1) The fusion splice portion 151 at which the optical fiber 140A extending from the rear pump light source 120A and the optical fiber 142A connected to the optical combiner 122A are connected to each other.

2) The fusion splice portion 152 at which the optical fiber 140B extending from the front pump light source 120B and the optical fiber 142B connected to the optical combiner 122B are connected to each other.

3) The optical combiner 122A.

4) The optical combiner 122B.

5) The fusion splice portion 153 at which the optical fiber 144 extending from the heat dissipation portion 126 and the optical fiber 146 connected to the laser emission portion 130 are connected to each other.

Furthermore, when a plurality of fiber laser apparatuses 100 as described above are combined with other, the aforementioned optical fiber fusion splice structure 1 can also be applied to an optical combiner operable to combine laser beams from the laser emission portions 130 of the respective fiber laser apparatuses 100.

In the illustrated example, the pump light sources 120A and 120B and the optical combiners 122A and 122B are provided on the front side and the rear side of the amplifying optical fiber 110 to form a bidirectional pumping type fiber laser apparatus. Nevertheless, one or more pump light sources and a combiner may be provided on only either one of the front side and the rear side of the amplifying optical fiber 110.

Although an example in which the aforementioned optical fiber fusion splice structure 1 is applied to a fusion splice portion of the fiber laser apparatus 100 has been described above, a fusion splice structure according to the present invention can be applied to a fusion splice portion in other types of laser apparatus. For example, a fusion splice structure according to the present invention is applicable to a fusion splice portion in a laser apparatus such as a $CO_2$ laser apparatus, a disk laser apparatus, or a direct diode laser (DDL) apparatus. Furthermore, when those laser apparatuses are to be manufactured, a method of manufacturing a laser apparatus according to the present invention can be used.

Example 1

The following experiments were performed in order to verify the effectiveness of the present invention. First, in a state before the pipe member 50 was fitted around the fiber accommodation portion 10 (the state shown in FIG. 6C), a semiconductor laser diode was connected to the optical fiber 21, and the output of the semiconductor laser diode was increased to a rated output of 18 A (about 200 W). The temperature increase of the optical fibers 21 and 22 was measured by the infrared analysis apparatus (thermography apparatus) 70. The highest temperature in the measured range was recorded. Additionally, in a state in which the pipe member 50 had been fitted around the fiber accommodation portion 10 (the state shown in FIG. 6D), the same measurements were performed so that the highest temperature in the measured range was recorded. Thirty-six experiment samples were produced in total and divided into six groups for the experiment. The experiment results were shown in the following Table 1.

TABLE 1

| Sample No. | Maximum Temperature | | Difference in Maximum Temperature |
|---|---|---|---|
| | Prior to filling of pipe member 50 | After filling of pipe member 50 | |
| No. 1-No. 6 | 40° C. | 36° C. | −4° C. |
| No. 7-No. 12 | 37° C. | 36° C. | −1° C. |
| No. 13-No. 18 | 37° C. | 38° C. | +1° C. |
| No. 19-No. 24 | 40° C. | 40° C. | 0° C. |
| No. 25-No. 30 | 41° C. | 36° C. | −5° C. |
| No. 31-No. 36 | 35° C. | 33° C. | −2° C. |

Figure 8:
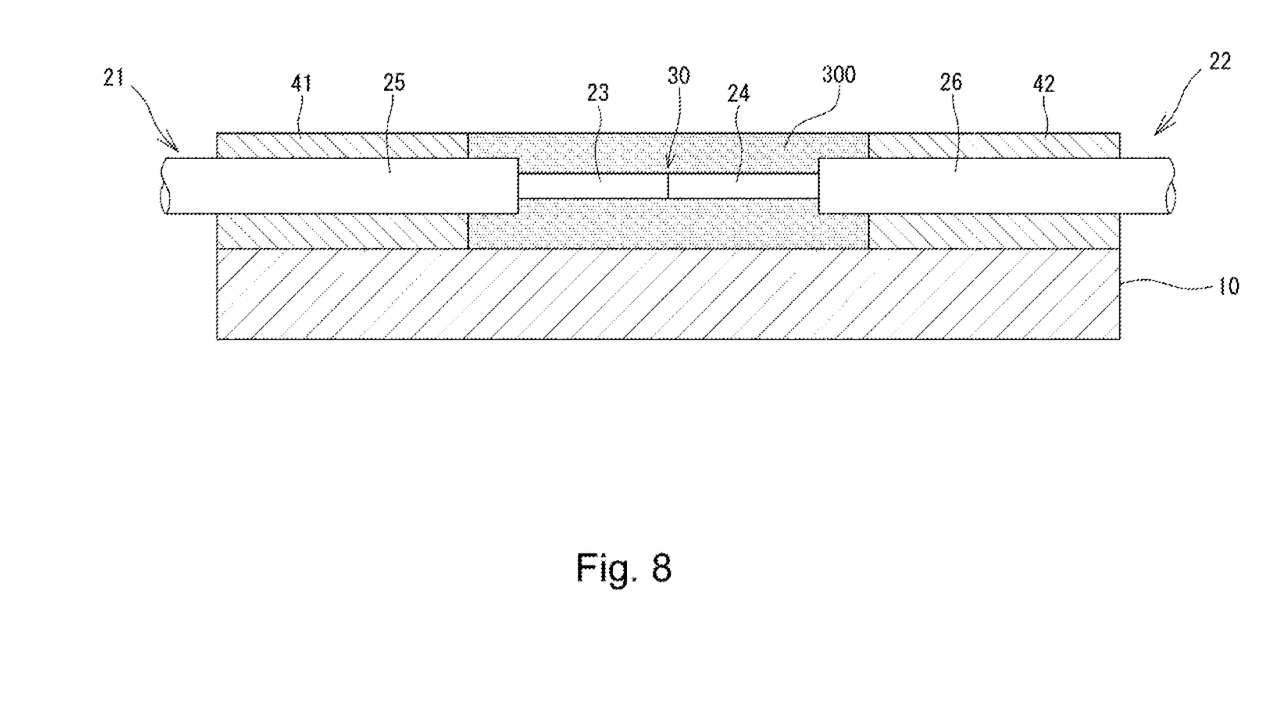
FIG. 8 is a cross-sectional view schematically showing an optical fiber fusion splice structure according to Comparative Example.

Furthermore, for Comparative Example, the same experiments were performed on an optical fiber fusion splice structure as shown in FIG. 8. Specifically, as shown in FIG. 8, for a optical fiber fusion splice structure in which a resin 300 having a refractive index that is equal to or lower than those of the claddings of the optical fibers 21 and 22 was filled into the fiber accommodation groove 12 so that the bare fibers 23 and 24 were covered with the resin 300, the temperature increase was measured by the infrared analysis apparatus prior to and after the filling of the resin 300. For the measurement, a semiconductor laser diode was connected to the optical fiber 21, and the output of the semiconductor laser diode was increased to 180 W. The temperature increase of the optical fibers 21 and 22 was measured by the infrared analysis apparatus. The experiment results were shown in the following Table 2.

TABLE 2

| Sample No. | Maximum Temperature | | Difference in Maximum Temperature |
|---|---|---|---|
| | Prior to filling of resin 300 | After filling of resin 300 | |
| No. 1 | 142° C. | 44° C. | −98° C. |
| No. 2 | 67° C. | 34° C. | −33° C. |
| No. 3 | 143° C. | 44° C. | −99° C. |

It can be seen from the results of Table 2 that the maximum measured temperature differs between the state prior to the filling of the resin 300 and the state after the filling of the resin 300. This means that, when the bare fibers 23 and 24 of the optical fibers 21 and 22 are covered with the resin 300, the temperature increase cannot be detected accurately by the infrared analysis apparatus because infrared rays radiated by heat generation in the optical fibers 21 and 22 does not transmit through the resin 300. In contrast, it can be seen from the results of Table 1 that the maximum measured temperature does not significantly differ between the state prior to the fitting of the pipe member 50 and the state after the fitting of the pipe member 50 and that the variation of the maximum measured temperature could be reduced to a range of ±5° C. This means that the temperature increase can be detected accurately by the infrared analysis apparatus because infrared rays radiated by heat generation in the optical fibers 21 and 22 does transmit through the pipe member 50.

Although some preferred embodiments of the present invention have been described, the present invention is not limited to the aforementioned embodiments. It should be understood that various different forms may be applied to the present invention within the technical idea thereof.

INDUSTRIAL APPLICABILITY

The present invention is suitably used for a laser apparatus including an optical fiber fusion splice structure for connecting optical fibers to each other by fusion splicing.

DESCRIPTION OF REFERENCE NUMERALS AND SIGNS

1 Optical fiber fusion splice structure
10 Fiber accommodation portion
10A-10D Outer surface
12 Fiber accommodation groove
12A-12C Inner surface
21, 22 Optical fiber
23, 24 Bare fiber
25, 26 Covering
30 Fusion splice portion
33, 34 Boundary
41, 42 Fixation resin
50 Pipe member
70 Infrared analysis apparatus
100 Fiber laser apparatus
110 Amplifying optical fiber
112 High-reflectivity FBG
114 Low-reflectivity FBG
120A, 120B Pump light source 122A, 120B Optical combiner
124, 126 Heat dissipation portion
130 Laser emission portion
140A, 140B, 142A, 142B, 143, 144, 146 Optical fiber
151, 152, 153 Fusion splice portion
S Hermetically sealed space

The invention claimed is:

1. An optical fiber fusion splice structure in which at least two optical fibers having a bare fiber and a covering that covers the bare fiber are connected to each other by fusion splicing, the optical fiber fusion splice structure comprising:
a fusion splice portion at which the bare fibers exposed from the coverings are connected to each other by fusion splicing;
a fiber accommodation portion having a fiber accommodation groove formed along an axis of the optical fibers, the fiber accommodation groove receiving a portion of the optical fibers including the fusion splice portion;
fixation resins for fixing a portion of the coverings on both sides of the fusion splice portion within the fiber accommodation groove, the fixation resins being formed so as to fill the fiber accommodation groove in a depth direction; and
a pipe member attached around the fiber accommodation portion so as to surround a space between the fixation resins on both sides of the fusion splice portion within the fiber accommodation groove, a portion of the pipe member which covers the fusion splice portion being exposed so as to allow measurement of an infrared ray transmitting through the exposed portion of the pipe member, the pipe member allowing an infrared ray to pass therethrough.

2. The optical fiber fusion splice structure as recited in claim 1, wherein an air cladding is formed between the fusion splice portion and an inner surface of the fiber accommodation groove.

3. The optical fiber fusion splice structure as recited in claim 1, wherein an air cladding is formed between a boundary of the bare fiber exposed from the covering and the covering and an inner surface of the fiber accommodation groove.

4. The optical fiber fusion splice structure as recited in claim 1, wherein the fiber accommodation portion has a shape of a rectangular parallelepiped in which the fiber accommodation groove has been formed.

5. The optical fiber fusion splice structure as recited in claim 1, wherein at least one of the optical fibers is used to transmit pump light from a pump light source.

6. The optical fiber fusion splice structure as recited in claim 1, wherein an infrared transmittance of the pipe member is at least 80%.

7. A method of manufacturing a laser apparatus including an optical fiber fusion splice structure in which at least two optical fibers having a bare fiber and a covering that covers the bare fiber are connected to each other by fusion splicing, the method comprising:
connecting the bare fibers exposed from the coverings to each other by fusion splicing to form a fusion splice portion;
receiving a portion of the optical fibers including the fusion splice portion within a fiber accommodation groove formed in a fiber accommodation portion along an axis of the optical fibers;
forming fixation resins so as to fill the fiber accommodation groove in a depth direction on both sides of the fusion splice portion in a state in which the optical fibers are held within the fiber accommodation groove, for fixing the coverings of the optical fibers within the fiber accommodation groove;
attaching, around the fiber accommodation portion, a pipe member that allows an infrared ray to pass therethrough so as to surround a space between the fixation resins on both sides of the fusion splice portion within the fiber accommodation groove such that a portion of the pipe member which covers the fusion splice portion is exposed;
connecting a laser source to at least one of the optical fibers so that a laser beam propagates through the optical fibers from the laser source;
measuring an infrared ray transmitting through the exposed portion of the pipe member while the laser beam is propagating through the optical fibers; and
verifying that the measured infrared ray is not more than a predetermined threshold to determine a completion of the apparatus.

8. The optical fiber fusion splice structure as recited in claim 2, wherein an air cladding is formed between a boundary of the bare fiber exposed from the covering and the covering and an inner surface of the fiber accommodation groove.

9. The optical fiber fusion splice structure as recited in claim 2, wherein the fiber accommodation portion has a shape of a rectangular parallelepiped in which the fiber accommodation groove has been formed.

10. The optical fiber fusion splice structure as recited in claim 2, wherein at least one of the optical fibers is used to transmit pump light from a pump light source.

11. The optical fiber fusion splice structure as recited in claim 2, wherein an infrared transmittance of the pipe member is at least 80%.

12. The optical fiber fusion splice structure as recited in claim 3, wherein the fiber accommodation portion has a shape of a rectangular parallelepiped in which the fiber accommodation groove has been formed.

13. The optical fiber fusion splice structure as recited in claim 3, wherein at least one of the optical fibers is used to transmit pump light from a pump light source.

14. The optical fiber fusion splice structure as recited in claim 3, wherein an infrared transmittance of the pipe member is at least 80%.

* * * * *